(12) United States Patent
Von Krosigk et al.

(10) Patent No.: US 7,270,314 B1
(45) Date of Patent: *Sep. 18, 2007

(54) METHOD FOR TREATING A FLUID TO INCREASE OXYGEN CONCENTRATION AND REDUCE SURFACE TENSION USING A DIRECT CURRENT GENERATOR OR AN ELECTROMAGNETIC FIELD GENERATOR

(75) Inventors: James Richard Von Krosigk, Nixon, TX (US); Larry John Dove, Okotoks (CA)

(73) Assignee: Innovative Industries, Inc., Baton Rouge, LA (US)

( * ) Notice: Subject to any disclaimer, the term of this patent is extended or adjusted under 35 U.S.C. 154(b) by 322 days.

This patent is subject to a terminal disclaimer.

(21) Appl. No.: 11/139,133

(22) Filed: May 27, 2005

Related U.S. Application Data

(60) Provisional application No. 60/575,917, filed on Jun. 1, 2004.

(51) Int. Cl.
*B01F 3/04* (2006.01)
(52) U.S. Cl. .................... 261/76; 95/58; 210/748; 210/758
(58) Field of Classification Search .............. 95/58, 95/79; 96/54; 210/150, 243, 748, 758, 760, 210/764; 261/76, 119.1, DIG. 42, DIG. 75
See application file for complete search history.

(56) References Cited

U.S. PATENT DOCUMENTS

| | | | |
|---|---|---|---|
| 4,214,962 A | 7/1980 | Pincon | 204/157.1 R |
| 4,274,970 A | 6/1981 | Beitzel | 210/748 |
| 5,304,289 A * | 4/1994 | Hayakawa | 205/701 |
| 5,507,932 A * | 4/1996 | Robinson | 204/230.2 |
| 6,193,878 B1 * | 2/2001 | Morse et al. | 210/85 |
| 6,623,695 B2 | 9/2003 | Malchesky | 422/12 |
| 6,932,903 B2 * | 8/2005 | Chang | 210/192 |
| 7,048,786 B1 * | 5/2006 | Von Krosigk et al. | 96/54 |

* cited by examiner

*Primary Examiner*—Scott Bushey
(74) *Attorney, Agent, or Firm*—Buskop Law Group, PC; Wendy Buskop

(57) ABSTRACT

A method for treating a fluid to increase oxygen content while reducing surface tension. The first step is flowing a fluid into a surface tension modification device at a first pressure and applying a direct current or an electromagnetic wave to modify a physical characteristic of the fluid forming an altered fluid. The next step is flowing oxygen or ozone into the altered fluid forming an altered fluid mixture. After the altered fluid mixture is formed, then flow the altered fluid mixture into the inner chamber of a multichamber device at a second pressure which is lower than the first pressure. The last step is passing the altered fluid mixture from the inner chamber through a plurality of funnels forming a turbid fluid condition at a focus point in an outside chamber to dissolve nano-sized oxygen particles into the fluid at an increased concentration.

14 Claims, 3 Drawing Sheets flowing a fluid into a surface tension modification device at a first pressure and flowing a direct current or an electromagnetic wave into the fluid enabling the direct current or electromagnetic wave to travel along the fluid for a defined distance to modify a physical characteristic of the fluid forming an altered fluid [100]

↓ flowing oxygen or ozone into the altered fluid forming an altered fluid mixture [110]

↓ flowing the altered fluid mixture into the inner chamber of a multichamber device at a second pressure which is lower than the first pressure [120]

↓ passing the altered fluid mixture from the inner chamber through a plurality of funnels forming a turbid fluid condition at a focus point in an outside chamber to dissolve nano-sized oxygen particles into the fluid at an increased concentration forming oxygenated water [130]

*FIG. 3*

METHOD FOR TREATING A FLUID TO INCREASE OXYGEN CONCENTRATION AND REDUCE SURFACE TENSION USING A DIRECT CURRENT GENERATOR OR AN ELECTROMAGNETIC FIELD GENERATOR

CROSS REFERENCE TO RELATED APPLICATIONS

The present application claims priority to co-pending U.S. Provisional Patent Application Ser. No. 60/575,917 filed on Jun. 1, 2004.

FIELD

The present embodiments relate to a method for treating a fluid containing water so as to increase oxygen content while reducing surface tension using a direct current generator or an electromagnetic field generator.

BACKGROUND

A need exists for a fluid with a dissolved oxygen content higher than occurring in nature while having a reduced surface tension for use in the construction industry. The uses can be for curing concrete, for use with municipal waste treatment plants to shorten the time for degradation of waste solids by aerobic bacteria and for the petrochemical and the pulp and paper industries which need to save energy in the biodegradation of wastes or other materials in waste water.

For construction, a need has existed for a method to cure concrete which is faster and more efficient than other building techniques. Concrete is typically made by adding water to a sand, aggregate, and cement mixture and then allowing the material to cure. This curing process usually take 28 days to achieve designed specifications. By providing a method which achieves the designed specifications of the concrete in only 4 to 14 days, the building process is shortened, and more efficient. In the event that a 28 day curing process is available, the result is a lower material cost for the same strength of concrete. The efficiency can be seen in reduced labor costs and also reduced defects occurring in the concrete due to adverse weather conditions during the curing period.

The embodiments of this method are designed to enhance the curing process of concrete by shortening the amount of time needed to cure the concrete due to an increased oxygen nano-particle content in conjunction with reduced surface tension of the water used in the making of the concrete.

A need has existed for a fluid source having a high concentration of dissolved nano-sized oxygen molecules with a reduced surface tension for use in municipal waste treatment plants. There exists a need to increase the aerobic biodegradation rates of municipal waste water treatment system which will increase the capacity of treatment plants without increasing plant size. Minimizing or eliminating the anaerobic biodegradation will eliminating the acid gas by products that will cause odors.

Additionally a need exists for the petrochemical, and pulp and paper industry to have reduced energy consumption for remediation of their waste water ponds. The embodiments of this invention provides water with a lower surface tension and increased oxygen content, enabling the water to flow into and out of the bacteria cell, with significantly less impedance. This high rate of water flow into and out of the cell enables the microorganisms to reproduce more quickly, increasing colony counts, thereby consuming the waste of the petrochemical streams and the streams of the pulp and paper industry.

The methods of the invention meet these above described needs.

SUMMARY

The embodiments of this invention are for a method of treating a fluid to produce a high nano-sized oxygen particle concentration and a low surface tension stream. The first step of the method is flowing a fluid into a surface tension modification device at a first pressure. The next step is applying an energy wave or a electromagnetic wave in the surface tension modification device. The next step is enabling the wave to travel along the fluid for a defined distance to modify a physical characteristic of the fluid, forming an altered fluid.

After the altered fluid is formed, then flow oxygen or ozone into the altered fluid forming an altered fluid mixture. The next step is to flow the altered fluid mixture into the inner chamber of a multi-chamber device at a second pressure which is lower than the first pressure.

The last step is passing the altered fluid mixture from the inner chamber through a plurality of funnels forming a turbid fluid condition at a focus point in an outside chamber to dissolve nano-sized oxygen particles into the fluid at an increased concentration forming oxygenated water.

BRIEF DESCRIPTION OF THE DRAWINGS

The present embodiments will be explained in greater detail with reference to the appended Figures, in which:

FIG. 3 provides the steps of the method in diagram form

Figure 1:
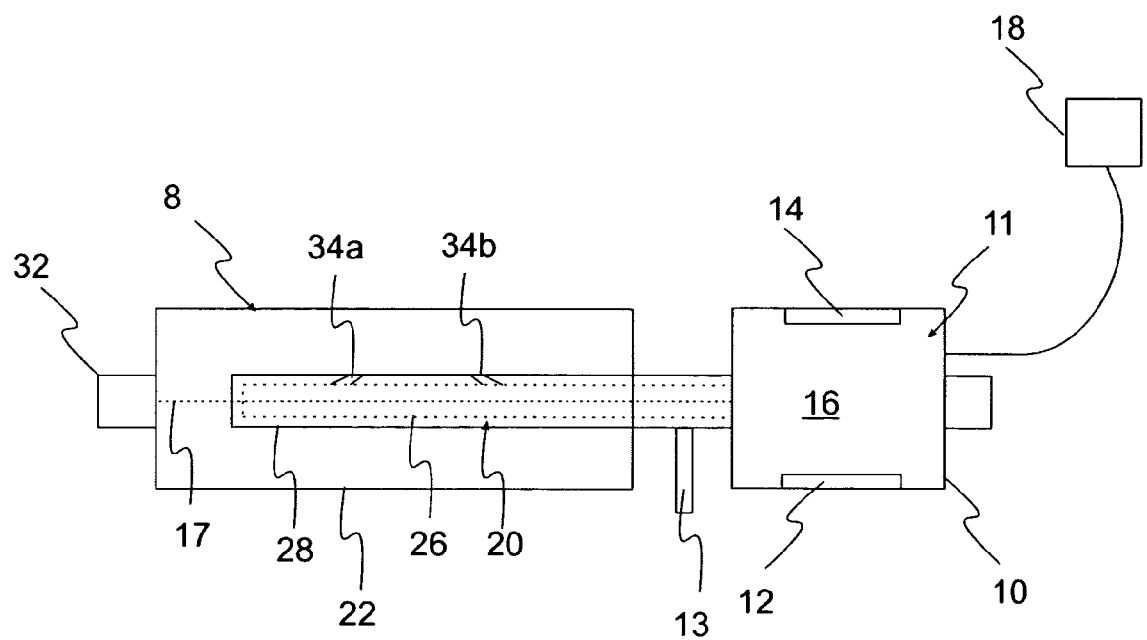
FIG. 1 depicts an overall diagram of an embodiment of the apparatus.

The present embodiments are detailed below with reference to the listed figures.

DETAILED DESCRIPTION OF EMBODIMENTS

Before explaining the present embodiments in detail, it is to be understood that the embodiments are not limited to the particular embodiments herein and it can be practiced or carried out in various ways.

The present embodiments describe a method for treating a fluid containing water to increase the dissolved nano-oxygen particle content and reduce the surface tension.

An embodiment of the method includes flowing a fluid containing water into a surface tension modification generator (STMG) at a first pressure. The STMG can be one of a variety of devices. It can be a device with an inner chamber with at least two probes, wherein a first probe emits an energy wave from a direct current generator or a electromagnetic wave and passes through the fluid to a second probe disposed in the inner chamber that grounds the current or wave. A STMG can use one length or variable lengths of waves. In one embodiment, the STMG can have more than one pair of probes, wherein one set of probes emits and grounds a wave of a first length and the another set of probes emits and grounds a second length of waves. In another embodiment, the STMG can have at least two pairs of probes, wherein each pair generates the same length of waves.

Next, the altered fluid is flowed into an inner chamber of a multichamber device that has at least two chambers. The inner chamber receives the altered fluid from the STMG and oxygen from a port connected to an oxygen source. It is contemplated that the port is a venturi effect generator, but it could be another type of port as well. The port causes a pressure drop of the fluid from the STMG to the inner chamber. Instead of oxygen, ozone can be flowed in through the port for the purpose of killing off bacteria, algae or other living matter which is undesired in potable water.

The mixture of oxygen and altered fluid at the lower pressure is then passed through a plurality of funnels disposed in the wall of the inside chamber to an outside chamber. The funnels create a turbid zone in a focus point to dissolve nano-sized gas molecules into the fluid stream.

Each funnel can comprise a large opening on the interior side of the inner chamber and a small opening on the outside chamber side of the wall of the inner chamber. In an embodiment, the funnels are generally directed toward the focus point. From about 2 to about 168 funnels can be used within the invention.

In one embodiment it is contemplated that method uses funnels angled from about 45 to about 90 degrees from the inner chamber axis.

Next the nano-particle gas containing stream, "the gas stream" is flowed from the outside chamber.

The STMG would use at least one direct current or electromagnetic wave, to minimize hydrogen bonding of the water, thereby forming a reduced surface tension nanoparticle oxygen containing stream.

The direct current can be produced by a DC generator, such as a DC200 direct current generator available from HBS Enterprises of Dubuque, Iowa of the United States. The electromagnetic waves can be produced by an electromagnet generator, available from Mag Tec Industries of Edinburg, Tex.

The fluid can be water, a mixture, a solution, a suspension, and combinations thereof.

The method involves using an apparatus which is more fully defined below and in the figures.

The method involves flowing the oxygen into the apparatus at a pressure from about 1 to about 100 psi and the fluid can flow at a rate from about 0.1 gallons to about 1000 gallons per minute.

The method creates sub-micron particles of oxygen that remain in the fluid as dissolved particles. The sub-micron (nano-sized) particles of oxygen remain in the fluid where placed or sink to the bottom rather than rising to the surface and escaping.

The phenomenon of increasing dissolved oxygen occurs because the sub-micron size of the oxygen particles are so small, that the density of the fluid generally exceeds the upward force caused by the difference in density between the sub-micron oxygen particles and the fluid.

The embodied method uses sub-micron oxygen generation technology in conjunction with an improved electrostatic device, STMG, for energizing fluids. Energizing the fluids lowers the surface tension of the fluids.

The STMG can include an electrostatic voltage spike signal generator, two or more radio frequency signal generators, one or more antennas, a fluid conduit, and optionally one or more signal boosters.

The method reduces surface tension of the fluid to increase the capacity and cost effectiveness of a myriad of critical industrial water management processes including reverse-osmosis (sea water to potable water), de-scaling of industrial water cooling systems, emulsion breaking applications for chemical and oil refineries, chemical oxygen demand (COD) reduction in industrial plants, such as paper mills, and de-oiling of oil drilling fluids and drill bit cuttings from subsurface strata.

In an alternative use, this device can be used to reduce the surface tension of the water used in concrete and thereby increasing the strength of concrete while lowering the cost to produce the concrete.

The embodied methods "energize" a fluid by supplying an influx of variable energy waves. The embodied methods energize the fluid by flooding the fluid with additional electrons.

For example, in water, the device energizes the water and satisfies the hydrogen ion ($H^+$) attraction to the unshared pair of electrons on any adjacent water molecules. In turn, a true reduction in hydrogen bonding between water molecules occurs. The true reduction in hydrogen bonding is measured as surface tension reduction. Typically, water molecules link up to each other because of the dipole nature of the individual water molecules. The bent water molecule structure in the free-state has three fundamental variations: symmetrical stretch, symmetrical bend, and the asymmetrical bend. The additional negative charges or the equivalent in charge density provided in the solution by the embodied devices reduce the bonding of the oxygen atoms of water molecules and the hydrogen atoms of other water molecules by supplying the negative charges (electrons) that the oxygen atoms attract. As a result, less hydrogen bonding exists between the individual water molecules. The result is "energized" water resulting in benefits such as better cleaning water and better soil-leaching water.

Table I summarizes the surface tension of water before and after the water is "energized" by this method. The water is tested at a range of temperatures.

TABLE 1

| TEMPERATURE (° C.) | SURFACE TENSION - "UN-ENERGIZED" (erg/cm2) | SURFACE TENSION - "ENERGIZED" (erg/cm2) |
|---|---|---|
| 5 | 74.9 | 60.2 |
| 10 | 74.22 | 57.3 |
| 15 | 73.49 | 56.3 |
| 18 | 73.05 | 54.2 |
| 20 | 72.75 | 50.3 |
| 25 | 71.97 | 47.5 |
| 30 | 71.18 | 42.5 |
| 40 | 69.56 | 40.3 |
| 50 | 67.91 | 38.5 |
| 60 | 66.18 | 35.3 |
| 70 | 64.4 | 35.0 |
| 80 | 62.6 | 34.5 |

Combining the sub-micron oxygen generation and the energizing technologies provides a benefit to living organisms, machinery, processes, and substances. The increased presence of oxygen on the bottom of given fluid source, such as a pond, affects the rate of microbial metabolic activity in the bottom of the pond.

The increased presence of oxygen also provides a significant increase in water treating capacity since the electrical demand needed to treat the oxygenated water is reduced by a considerable amount.

The embodied methods provide a quick and cost-effective manner to inject dissolved oxygen into a fluid or body of water.

Ample dissolved oxygen (DO) is required for effective wastewater treatment from pulp and paper plants, or activated sludge from petrochemical plants. The embodied methods generate billions of nano-sized oxygen particles that are so small that the particles do not have enough mass to overcome the water's natural density and rise to the water's surface. In combination with surface tension reduction technology water's tendency to burst "bubbles" is also reduced. Therefore, the nano-sized oxygen particles sink or remain suspended in the water.

The embodied methods accelerate the rate of transfer of oxygen into water through the large surface area created by the enormous population of micro-particles. The generated nano-oxygen particles can be delivered at approximately 5 cubic feet/minute (CFM) of oxygen using a 0.5 HP pump.

With reference to the figures, FIG. 1 depicts an overall diagram of an embodiment of the apparatus for treating a fluid using the embodied methods.

FIG. 1 depicts the apparatus usable with the method comprising an STMG (10) with an STMG chamber (11). Probes (12 and 14) are located in the STMG chamber (11) which can create a radio frequency to pass through a fluid (16). Although it should be noted at least two different frequencies can be used effectively in the STMG and produce the reduced surface tension fluid. The STMG (10) can be powered with an external power source (18).

A multi-chambered device (8) is shown with a inner chamber (20) and an outer chamber (22) enclosing the inner chamber. The outer chamber has an outer chamber exit port (32). The inner chamber (20) has an interior surface (26) and an exterior surface (28). The inner chamber (20) has an axis (17). The inner chamber has at least 2 funnels (34a and 34b) disposed in the walls of the inner chamber.

A port (13) is shown for delivering gas from a gas source to the inside chamber wherein the port in an embodiment is a venturi effect generator. The gas source can provide oxygen, ozone, air, ethylene, carbon dioxide, carbon monoxide, ethylene oxide, and other gases or combinations thereof.

The multi-chambered device can be made of variety of materials including polyvinyl chloride, stiff elastomeric materials, glass, carbon fiber, fiberglass, stainless steel, other metals and alloys thereof, plastic composites, or combinations of these materials. The outer chamber can be coated or fiber wrapped.

Figure 2:
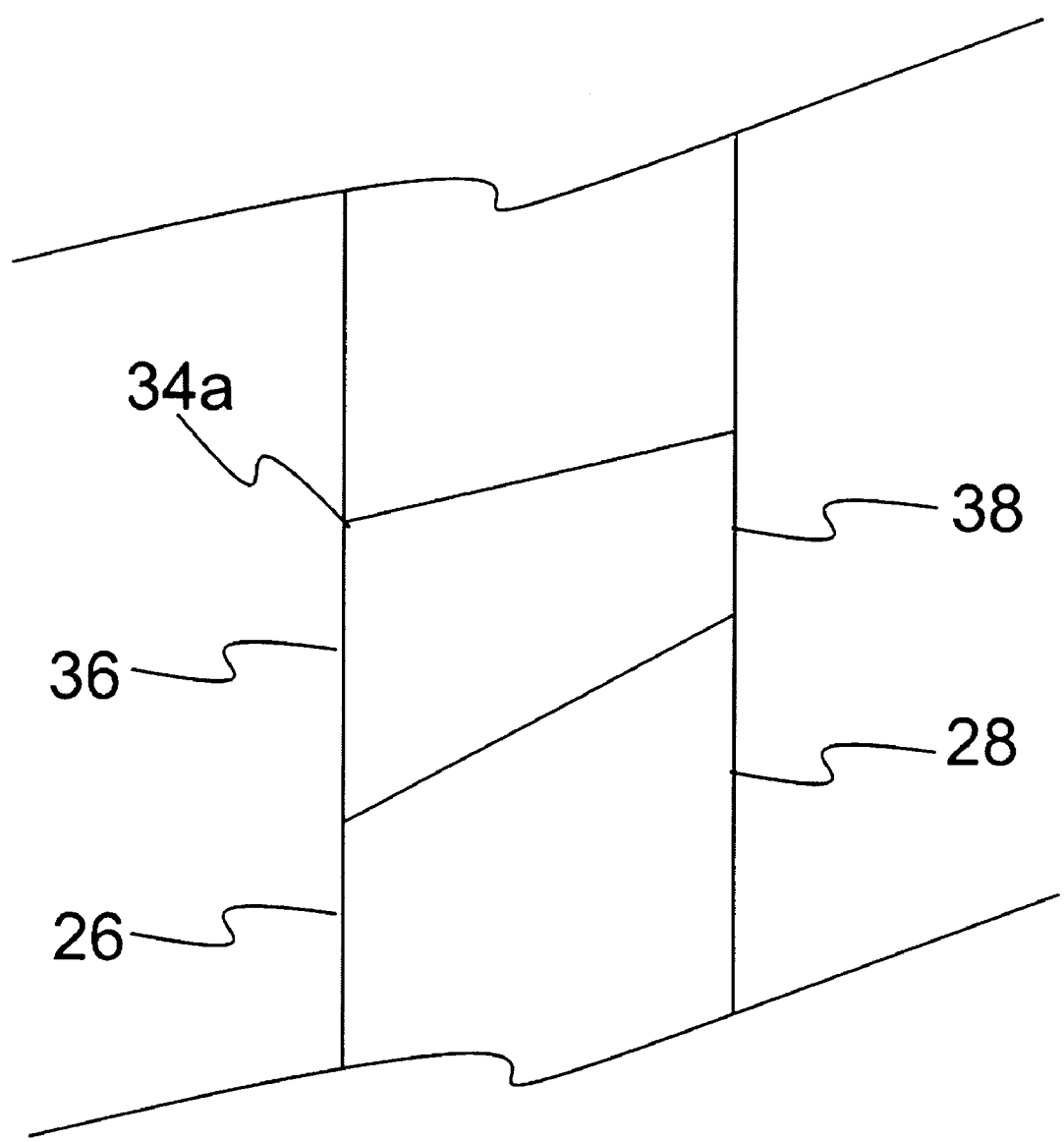
FIG. 2 depicts a cross section of the funnels used in the method.

FIG. 2 depicts a cross section of one of the funnels (34a). The funnel (34a) has a large opening (36) on the interior side (26) and a small opening (38) on the exterior side (28). The small opening is located on the exterior side of the inner chamber and the large opening is located on the interior side of the inner chamber. The funnels shown are angled from about 45 to about 90 degrees from the inner chamber axis.

In an embodiment, the apparatus can include from about two funnels to about twenty-four funnels in the walls of the inner chamber but 168 or more can be used. In another embodiment the inner chamber can be non-removeably connected to the outside chamber. The outer chamber (22) can be bonded to the inner chamber (20) using an adhesive, a mechanical engagement device, welding, glazing if glass is used, melting if polymer or plastic is used, or combinations thereof.

In an embodiment, the funnels can be located equidistant around the inner chamber.

In an alternative embodiment, the funnels can be disposed around the inner chamber at orientations 45 degrees, 90 degrees, and 180 degrees off the inner chamber axis.

The method contemplates the fluid is at a first pressure in the STMG and at a second pressure in the inner chamber. The first pressure can be from about 5% to about 40% greater than the second pressure. The fluid pressure drops as the fluid flows through the apparatus.

The waves that can be used herein can be two or more distinct wave lengths. The generators can cooperate to provide an improved electrostatic apparatus useful in particular surface tension reducing applications for fluids in order to enhance the oxygenation process.

In one embodiment, the method contemplates using at least two different wave lengths per a defined unit of time to treat the nano-particle containing oxygen stream.

The method can be used to cure concrete faster by increasing oxygen while reducing surface tension of the water to be added to the sand, aggregate and cement mixture.

The method enables electrochemical changes to occur that lowers the hydrogen bonding of water molecules; inhibits scale and corrosion formation; dissolves existing scale and corrosion; increases the cleaning power of water; slows or eliminates the uptake of metals into cellular structure; and leaches away excessive salts from soil.

The source fluid can be water, water-based fluids, and organic fluids. The source fluid can be a solution, suspension, emulsion, colloid, gel, or other such fluid. The energized fluid does not have to be de-energized before the fluid is used in manufacture, storage, transportation, relocation, and identification processes.

Exemplary mechanical benefits include improved octane rating of standard petroleum based fuels; reduction in pollutant formation during combustion of fuels; reduced curing time for concrete and mortar; reduction in perceived bitterness in plant extracts; and reduction in scale formation and build-up in fluid conduits. Agriculture and health benefits include improved sterilization of water with high microbial content; enhancement of flavor in drink syrup or concentrate; improved crop growth and condition, increased crop productivity, increased water percolation into soil, increased efficiency of fertilizers and nutrients; improved plant drought tolerance, and improved leaching of salts into subsoil. Other benefits are improved digestion of large organic molecules in living organisms.

The sub-micron particle dispersion devices were tested in concrete and mortar using the method. The results from the tests show that the resulting infused concrete exceeds 5000 psi crush strength in less than seven days of curing versus four weeks for the same concrete batch without sub-micron particle dispersion. The embodied sub-micron particle dispersion devices offer a profound impact on the economics of the construction and oil and gas drilling industries. Table II summarizes the results from the sub-micron particle dispersion devices tested in concrete and mortar. Batch Number 4 may have contained more water content than the others.

In this test five different waters were used in the method:

TABLE II

| Batch Number | % Saturation | Day 2/psi | Day 7/psi | Day 14/psi | Day 28/psi |
| --- | --- | --- | --- | --- | --- |
| 1 (control) | 94.2 | 1845 | 4265 | 4640 | 5340 |
| 2 (Surface tension only) | 92.4 | 2490 | 5500 | 6200 | 6820 |
| 3 (Oxygen Only) | 207.3 | 2725 | 5740 | 6200 | 7110 |
| 4 (Oxygen Only) | 415.0 | 1910 | 5235 | 6050 | 6645 |
| 5 (Oxygen and Surface tension reduction) | 380.0 | 2645 | 5840 | 6685 | 7400 |

FIG. 3 depicts a flow chart of an embodiment of the method for treating a fluid to produce a high nano-particle oxygen concentration low surface tension stream.

The first step is a flowing a fluid into a surface tension modification device at a first pressure and flowing a direct current or an electromagnetic wave into the fluid enabling the direct current or electromagnetic wave to travel along the fluid for a defined distance to modify a physical characteristic of the fluid forming an altered fluid [100].

The next step is flowing oxygen or ozone into the altered fluid forming an altered fluid mixture [110].

After the altered fluid is formed, the next step is flowing the altered fluid mixture into the inner chamber of a multichamber device at a second pressure which is lower than the first pressure [120].

The last step in the method can be passing the altered fluid mixture from the inner chamber through a plurality of funnels forming a turbid fluid condition at a focus point in an outside chamber to dissolve nano-sized oxygen particles into the fluid at an increased concentration forming oxygenated water [130].

While these embodiments have been described with emphasis on the embodiments, it should be understood that within the scope of the appended claims the embodiments might be practiced other than as specifically described herein.

What is claimed is:

1. A method for treating a fluid to produce a high nano-particle oxygen concentration low surface tension stream comprising the steps of:
   a. flowing a fluid into a surface tension modification generator at a first pressure and flowing an energy wave from a dead short direct current generator into the fluid enabling the energy wave to travel along the fluid for a defined distance to modify a physical characteristic of the fluid forming an altered fluid;
   b. flowing a gas into the altered fluid forming an altered fluid mixture;
   c. flowing the altered fluid mixture into an inner chamber of a multichamber device at a second pressure which is lower than the first pressure;
   d. passing the altered fluid mixture from the inner chamber through a plurality of funnels forming a turbid fluid condition at a focus point in an outside chamber to dissolve nano-sized gas particles into the fluid at an increased concentration forming dissolved gas in a fluid mixture.

2. The method of claim 1, wherein the gas is oxygen, ozone, air, ethylene, carbon dioxide, carbon monoxide, ethylene oxide, or combinations thereof.

3. The method of claim 1, wherein the fluid comprises water and solids.

4. The method of claim 1, wherein the step of flowing the fluid through the plurality of funnels uses from about 2 funnels to about 24 funnels.

5. The method of claim 1, comprising flowing the gas into the altered fluid at a pressure from about 1 psi to about 100 psi.

6. The method of claim 1, comprising flowing the fluid into the surface tension modification generator at a rate from about 1 gallon per minute to about 1000 gallons per minute.

7. The method of claim 1, further comprising providing the energy wave at least two different lengths per a defined unit of time.

8. A method for treating a fluid to produce a high nano-particle oxygen concentration low surface tension stream comprising the steps of:
   a. flowing a fluid into a surface tension modification generator at a first pressure and flowing an electromagnetic wave from a electromagnetic generator into the fluid enabling the electromagnetic wave to travel along the fluid for a defined distance to modify a physical characteristic of the fluid forming an altered fluid;
   b. flowing a gas into the altered fluid forming an altered fluid mixture;
   c. flowing the altered fluid mixture into an inner chamber of a multichamber device at a second pressure which is lower than the first pressure;
   d. passing the altered fluid mixture from the inner chamber through a plurality of funnels forming a turbid fluid condition at a focus point in an outside chamber to dissolve nano-sized gas particles into the fluid at an increased concentration forming dissolved gas in a fluid mixture.

9. The method of claim 8, wherein the gas is oxygen, ozone, air, ethylene, carbon dioxide, carbon monoxide, ethylene oxide, or combinations thereof.

10. The method of claim 8, wherein the fluid comprises water and solids.

11. The method of claim 8, wherein the step of flowing the fluid through the plurality of funnels uses from about 2 funnels to about 24 funnels.

12. The method of claim 8, comprising flowing the gas into the altered fluid at a pressure from about 1 psi to about 100 psi.

13. The method of claim 8, comprising flowing fluid into the surface tension modification generator at a rate from about 1 gallon to about 1000 gallons per minute.

14. The method of claim 8, further comprising providing the electromagnetic wave at least two different lengths per a defined unit of time.

* * * * *